June 28, 1955 A. RICKENMANN 2,711,934
JOURNAL AND THRUST BEARING ARRANGEMENT
Filed May 19, 1953 2 Sheets-Sheet 1
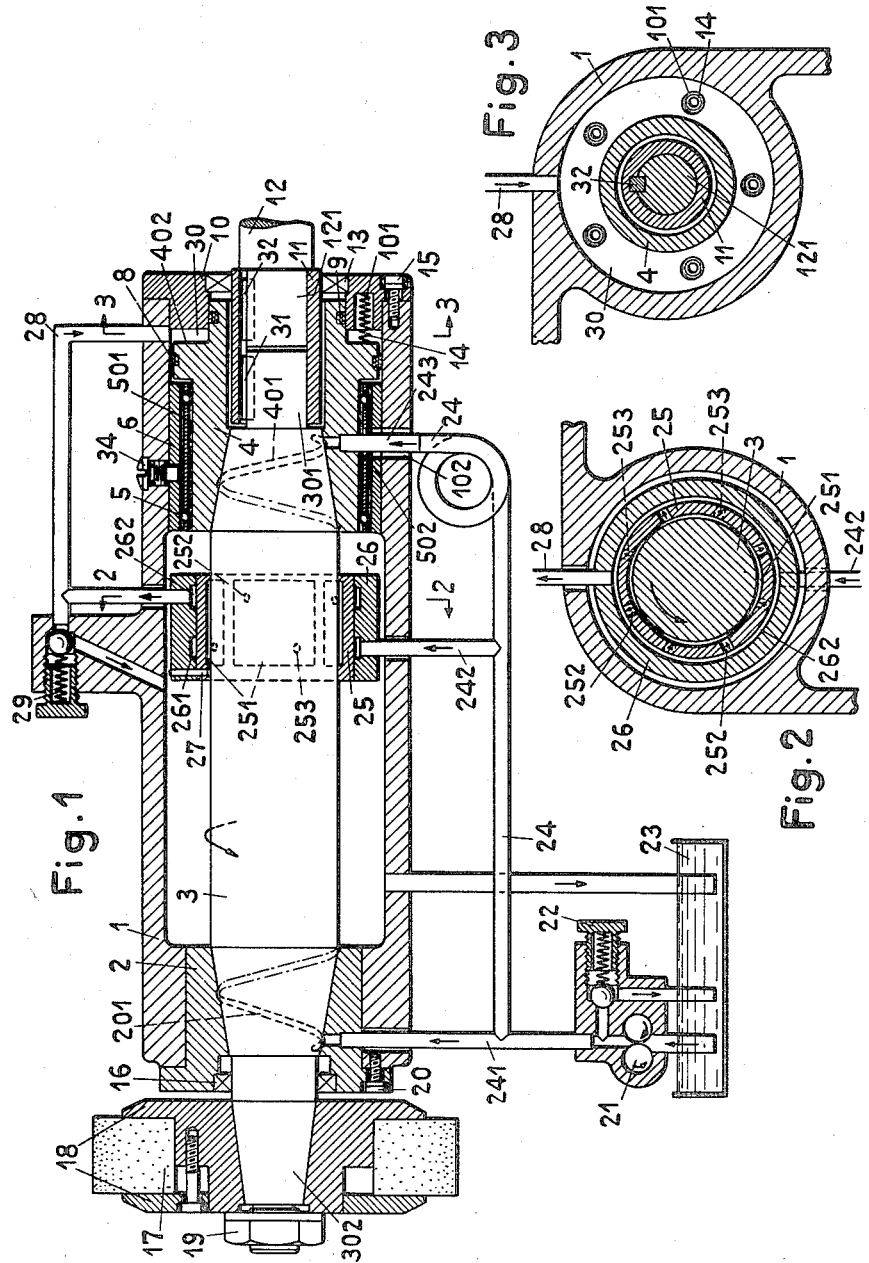
Inventor:
Alfred Rickenmann,
by Singer Stern & Carlburg
Attorneys.

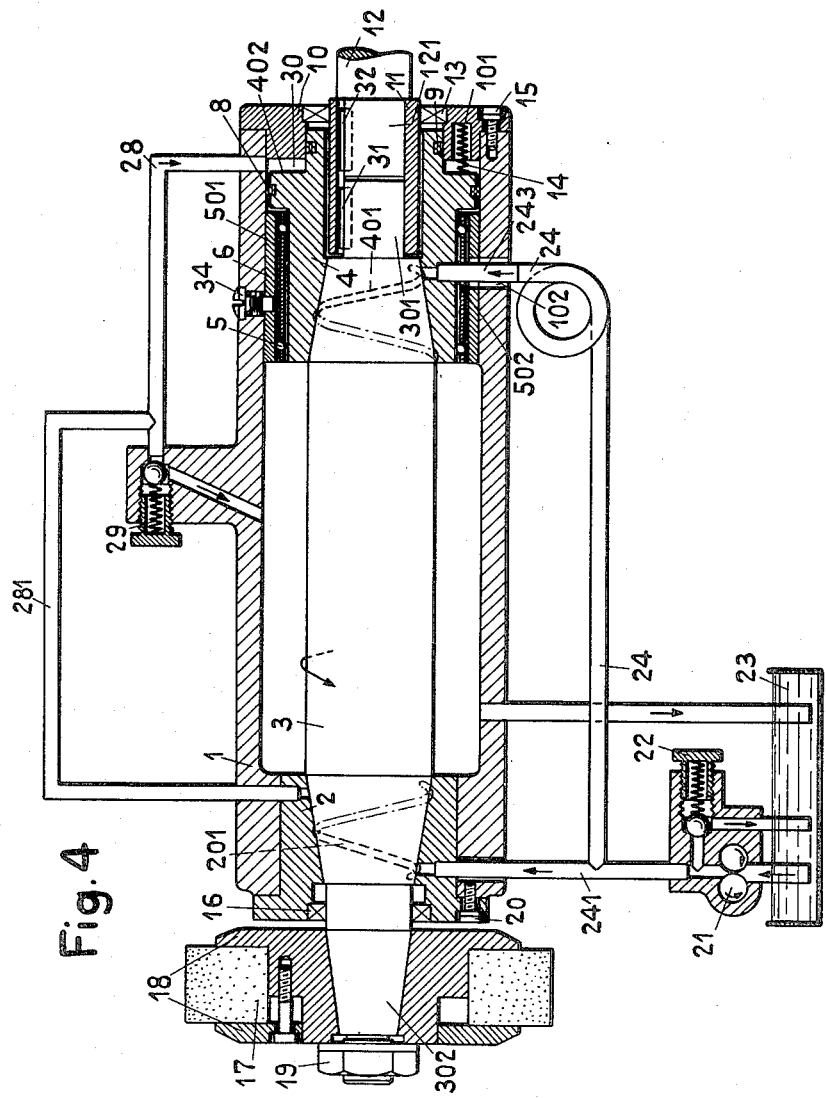

United States Patent Office 2,711,934
Patented June 28, 1955

2,711,934
JOURNAL AND THRUST BEARING ARRANGEMENT

Alfred Rickenmann, Kusnacht, Zurich, Switzerland, assignor to Reishauer-Werkzeuge A.-G., Zurich, Switzerland Application May 19, 1953, Serial No. 356,021

Claims priority, application Germany May 23, 1952

7 Claims. (Cl. 308—9)

The invention relates to a journal and thrust bearing arrangement, particularly for the spindle of a grinding wheel, wherein a spindle having truncated conical bearing surfaces pointing in opposite directions is journalled in truncated conical bearing bushings supplied with lubricating oil, one of which bushings is fixed and the other is shiftable in the axial direction and resiliently biased towards its associated bearing surface on the said spindle, which is thus resiliently clamped between the said two truncated conical bearing bushings. Such a journal and thrust bearing arrangement will be called hereinafter "a bearing arrangement of the kind referred to."

The play existing between the spindle and the bushings of the bearing is represented by the thickness of the lubricating oil film between them. With spindles, which are used for very accurate operations, a very small play only is permitted in the bearings. On the other hand, it is to be noted that with suitably selected lubricating oils it is quite possible to maintain an extremely thin oil film continuously intact once the same has been established. A thin oil film and the associated small play in the bearings can be established with truncated conical bearing surfaces then only when the oil film enveloping the truncated cone of the spindle is compressed. For this purpose axial forces are required, i. e. the resilient bias mentioned hereinabove has to be selected the stronger, the higher is the operational speed of rotation of the spindle in order to keep the pressure of the lubricating oil produced by the rotation of the spindle in equilibrium.

The axial forces which are adapted to the operational speed of rotation of the spindle act on the movable bushing of the bearing also during a standstill. The spindle may accordingly be considered when in a state of rest as a body which is clamped-in between the two bushings of the bearings and which is loaded with considerable axial forces.

This system of journalling the spindle, which in its basic principles has been found excellent, could hitherto be applied in a restricted scope only because considerable difficulties were met in operation. These difficulties consisted in that, when starting the run of a spindle clamped-in between the two bushings of the bearings, the formation of an oil film was no longer possible as soon as the axial loading applied by the resilient means exceeded a certain maximum limit.

This disadvantage could be overcome as long as the starting of the run of the spindle could be effected in the cold condition, by preventing the shiftably arranged bushing of the bearing from pressing on the spindle, for example by means of an abutment face on the surrounding casing of the spindle. In these circumstances a certain play in the bearings was allowed at a standstill in the cold condition by the selection of suitable dimensions, so that the formation of an oil film was possible when starting the run of the spindle.

When however—as was the case even after a short time of running—the axially shiftable bushing did undergo bodily displacement owing to thermal expansion of the spindle and was lifted off the said abutment face, the shiftable bushing of the bearing came forcibly to bear on the associated truncated cone of the spindle when the latter was stopped. When subsequently the spindle had to be started again—this time from the warm condition—this had to be effected in other and more difficult circumstances, and seizing of the spindle and bearing bushings frequently occurred.

It is the main object of the present invention to provide a journal and thrust bearing arrangement of the kind referred to which secures a permanent and constant working accuracy in the most varied conditions of operation.

It is a particular object of the present invention to provide a journal and thrust bearing arrangement of the kind referred to which allows safely to restart the spindle journalled therein in the warm condition.

With these and other objects in view I provide a journal and thrust bearing arrangement comprising in combination: a bearing casing, a first bearing bushing having a truncated conical bore fixedly mounted in the said casing, a second bearing bushing having a truncated conical bore tapering in the opposite direction to and in alignment with the said first bearing bushing, the said second bearing bushing being restrained from rotating but axially slidable relative to the said casing, a spindle having two opposed truncated conical bearing surfaces journalled respectively in the said fixed and axially slidable bearing bushings, comparatively weak resilient means abutting on the said casing and on the said slidable bushing biasing the latter towards its associated bearing surface on the said spindle, hydraulic pressure generating means operated by the said spindle generating a pressure increasing at increasing speed of rotation thereof, and hydraulic loading means exposed to the said hydraulic pressure biasing the said shiftable bearing bushing in the same direction as the said comparatively weak resilient means with a force exceeding in order of magnitude the force of the said resilient means as soon as the said spindle has exceeded its starting speed.

The resilient means as used in the known constructions of bearings are dimensioned in the bearing arrangement according to the present invention to such a strength only, that the movable bearing bushing can follow up at any time the variations in length of the spindle as caused by the influences of temperature. The forces to be applied for this purpose are very small. It should be noted that consequently also the forces acting on the spindle in a state of rest are small. Accordingly the formation of an oil film when starting the spindle is made possible without difficulty thanks to this low loading. Starting and stopping the spindle can be effected at any temperature of the bearings without any fear of seizure between the spindle and the bearing bushings. However, in order to be able to balance the pressure of the lubricating oil which prevails when starting and at the operational speed of rotation, means are provided according to the invention which at increasing speed of rotation cause likewise a gradual increase of hydraulic pressure which acts additionally to and in the same direction as the pressure of the resilient means on the movable bushing of the bearing, as stated hereinbefore.

The said hydraulic pressure can for example be generated by means of a cylindrical bushing fixedly mounted in the said casing surrounding the said spindle with a suitable running fit, with crescent shaped recesses in the said cylindrical bushing adjacent the said spindle, conduit means connecting the ends, facing the direction of rotation, of the said recesses to an external source of hydraulic fluid; alternatively it could be derived from the space between the said fixed truncated conical bearing bushing and its associated bearing surface on said spindle.

Piston means exposed to the said hydraulic pressure may be provided on the end face of the said axially shiftably bearing bushing facing away from its associated truncated conical bearing surface on the said spindle.

Hydraulic control means may be provided between the said hydraulic pressure generating means and the said hydraulic loading means whereby said pressure may be reduced to the value desired.

In order to guide the said axially shiftable bearing bushing in the said bearing casing substantially without any radial play and with as little friction as possible at least two rows of prestressed balls may be arranged between the circumference of the said axially shiftable bushing and a bore of the said casing.

These and other objects and features of my invention will now be explained with reference to some embodiments thereof illustrated by way of example in the accompanying drawings, in which:

Fig. 1 is a longitudinal section of a bearing arrangement for a grinder spindle, Fig. 2 is a cross section on line 2—2 of Fig. 1, Fig. 3 is a cross section on line 3—3 of Fig. 1, Fig. 4 is a longitudinal section of a modification of the embodiment illustrated in Fig. 1.

In the bearing casing 1 the spindle 3 is journalled in the two bearing bushings 2 and 4. The two bearing surfaces are constructed as two oppositely directed truncated cones. The cylindrical end 301 situated on the right hand side of the spindle 3 as well as the adjacent end 21 of the driving shaft 12 are embraced by the coupling sleeve 11. In addition to the coupling sleeve 11, the two keys 31 and 32 serve for the transmission of the rotary movement. The spindle end 302 situated on the left hand side is likewise constructed as a truncated cone. By means of the nut 19 a disc flange 18 is clamped on to it which is equipped with a grinding disc 17.

The bushing 2 of the bearing arranged on the left hand side is immovably fixed to the casing 1 of the bearing by means of a number of screws 20. The conical bore of the bearing is provided with a spiral lubrication groove 201. In order that losses in lubricating oil may be obviated, a packing ring 16 is inserted into the bushing 2 of the bearing. On the right hand side end of the casing 1 of the bearing a closure lid 10 is attached by the aid of the screws 15. The leakage of lubricating oil is here prevented by the packing ring 13 which is retained by the said lid. In the lid 10 there is a number of holes 101—in the embodiment illustrated there are five (see Fig. 3)—which serve as guides to compression springs 14 housed therein. These springs which bear on the bottom of the holes 101 permanently bias the shiftable bushing 4 of the bearing towards the left. The bushing 4 of the bearing encloses the associated truncated cone of the spindle 3. On the conical bearing surface there is likewise a spiral lubrication groove 401.

The axially shiftable ball guide 5 consists of the ball cage 501 and two rows of balls arranged parallel to one another. The ball guide 5 is centered by the internal bore of the bushing 6. The balls of the ball guide 5 are inserted prestressed between the bushing 6 and the bushing 4 of the bearing. By this measure an axial displacement of the bushing 4 of the bearing is made possible with a minimum requirement of force, and moreover a guidance of the bushing 4 of the bearing free from play is safeguarded. The bushing 6 is arrested by the aid of the screw 34.

The socket 243 attached to the bushing 4 of the bearing penetrates through the ball cage 501 and the casing 1 of the bearing. Outside the casing 1 of the bearing it is connected to the resiliently mounted tube coil of the lubricating pipe line 24. The aperture 102 in the casing 1 of the bearing is made slot-shaped. By this measure, rotary movements of the bushing 4 of the bearing are restrained, while axial displacements are permitted. The shape of the movable bushing 4 of the bearing is chosen in such a manner that a chamber 30 of annular cross section is formed between it, the lid 10 and the enveloping casing 1 of the bearing. This chamber 30 is sealed by the two packing rings 8, 9 which are guided by the bushing 4 of the bearing.

Between the bushings 2, 4 of the bearing the bushing 25 is mounted with a suitable running fit on the cylindrical middle portion of the spindle 3. The said bushing 25 in turn fits into the bushing 26. The bushings 25 and 26 are mutually fixed by the aid of the cylindrical dowel pin 27. They are moreover restrained from performing rotational movements and axial displacements by the oil supply socket 242 which is screwed into the bushing 26 and which is guided in a bore of the casing 1 of the bearing. The outer bushing 26 is provided with two annular grooves 261 and 262, while the inner bushing 25 has a number of crescent-shaped chambers 251, viz. in the embodiment illustrated four of them.

The annular groove 261 through four holes 253, and the annular groove 262 through four holes 252 are respectively in communication with the four chambers 251. It should be noted that the holes 253 when viewed in the direction of rotation of the spindle 3, are at the beginning of the chambers 251, whereas the holes 252 are at the ends thereof.

The lubricating oil required for the bearings is derived from the container 23. The gear pump 21 feeds the lubricating oil into the pressure line 24. The maximum permissible lubricating oil pressure is adjusted by means of the pressure regulator valve 22. It is selected so high only that a permanent supply with lubricating oil of the bearings 2, 4 and of the bushing 25 is safeguarded. The lubricating oil flows through the socket 241 to the bushing 2 of the bearing into the spiral groove 201 provided there, moreover through the socket 242 into the annular groove 26, and from there through the holes 253 into the chambers 251. From there via the holes 252, the annular groove 262, and the line 28, the chamber 30 is replenished with lubricating oil. The pipe coil of the line 24 attached to and resiliently arranged on the bushing 4 of the bearing is connected to a socket 243 which leads the lubricating oil to the lubricating oil groove 401.

The conditions described so far apply to the spindle 3 being in a state of rest. The springs 14 press on the bushing 4 of the bearing, which in turn abuts on the truncated cone of the spindle disposed on the right hand side, so that the spindle 3 may be considered as being clamped between the two bushings 2 and 4 of the bearing.

When starting, the driving shaft 12 drives the spindle 3 via the key 32, the coupling sleeve 11 and the key 31. As soon as a rotational movement begins, the lubricating oil present in the two lubricating grooves 201 and 401 is carried along by the rotating spindle 3, so that the two truncated cones are soon enveloped by a mantle of lubricating oil. The magnitude of the resultant axial pressure exerted by the springs 14 is so selected, that it permits on the one hand the formation of an oil film when starting the spindle 3, and on the other hand is capable of bringing the bushing 4 of the bearing at any time to the left hand side, respectively, on the associated truncated cone of the spindle, when no other forces act on the bushing 4 of the bearing.

The film of lubricating oil which is under the influence of the spindle 3 rotating at ever increasing speed tends to escape and accordingly exerts an axial thrust which increases with increasing speed or rotation. Since the bushing 2 of the bearing disposed on the left hand side is fixed immovably, whereas the bushing 4 of the bearing is arranged movably, the axial thrust generated by the lubricating oil would soon effect a shifting of the bushing 4 of the bearing towards the right in view of the weakly dimensioned springs 14. In order to prevent this displacement towards the right an additional axial thrust towards the left, i. e. in the same direction as the thrust effected by the springs 14 is exerted. This axial thrust is generated as follows:

As mentioned hereinbefore, the lubricating oil flows from the annular groove 261 through the holes 253 into the chambers 251. Upon rotation of the spindle 3 a pressure is set up in the pent-up lubricating oil in the zones lying at the end of the individual chambers 251 as viewed in the direction of rotation. This pressure is the higher, the faster the spindle 3 rotates. The pressure oil present in the said zones flows through the holes 252 into the annular groove 262, and gets from there via the line 28 into the chamber 30. The hydraulic pressure prevailing consequently in this chamber 30 forces the movable bushing 4 of the bearing towards the left. The annular area 402 exposed to the hydraulic pressure on the bushing 4 of the bearing is so dimensioned that the axial thrust resulting from the product of hydraulic oil pressure by the area of the annular surface is sufficient to prevent a displacement towards the right of the movable bushing 4 of the bearing in consequence of the axial thrust caused by the films of lubricating oil. In the line 28 a pressure regulator valve 29 is built in. Thereby the maximum permissible pressure in the line 28 and in the chamber 30 can be adjusted.

In this manner it is made possible to achieve on the one hand a smooth starting of the spindle 3 with a very low load, and on the other hand to establish and maintain a state of equilibrium on the spindle 3 rotating at operational speed, which allows constantly a very small play in the bearings, i. e. a thin oil film.

The embodiment illustrated in Fig. 4 is a modification and shows a bearing arrangement of the spindle, in which the pressure required for the loading of the bushing 4 of the bearing is generated in the fixed bushing 2 of the bearing and is derived therefrom. In this arrangement the hydraulic pressure fluid flows from the groove 201 via the pipe 281 into the pipe 28. This arrangement has the advantage that the two bushings 25, 26 mounted on the spindle 3 are dispensed with.

A further possibility would exist in combining the two bushings 25, 26 with a cylindrical bearing of the driving shaft 12. The lubricating oil supplied through the socket 242 would then be used for the lubrication of the said bearing of the driving shaft 12 as well as for the loading of the movable bushing 4 of the bearing.

While I have described and illustrated what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. A journal and thrust bearing arrangement comprising in combination: a bearing casing, a first bearing bushing having a truncated conical bore fixedly mounted in the said casing, a second bearing bushing having a truncated conical bore tapering in the opposite direction to and in alignment with the said first bearing bushing, the said second bearing bushing being restrained from rotating but axially slidable relative to the said casing, a spindle having two opposed truncated conical bearing surfaces journalled respectively in the said fixed and axially slidable bearing bushings, comparatively weak resilient means abutting on the said casing and on the said slidable bushing biasing the latter towards its associated bearing surface on the said spindle, hydraulic pressure generating means operated by the said spindle and generating a pressure increasing at increasing speed of rotation thereof, and hydraulic loading means exposed to the said hydraulic pressure biasing the said shiftable bearing bushing in the same direction as the said comparatively weak resilient means with a force exceeding in order of magnitude their force as soon as the said spindle has exceeded its starting speed.

2. A journal and thrust bearing arrangement comprising in combination: a bearing casing, a first bearing bushing having a truncated conical bore fixedly mounted in the said casing, a second bearing bushing having a truncated conical bore tapering in the opposite direction to and in alignment with the said first bearing bushing, the said second bearing bushing being restrained from rotating but axially slidable relative to the said casing, a spindle having two opposed truncated conical bearing surfaces journalled respectively in the said fixed and axially slidable bearing bushings, comparatively weak resilient means abutting on the said casing and on the said slidable bushing biasing the latter towards its associated bearing surface on the said spindle, a cylindrical bushing fixedly mounted in the said casing surrounding the said spindle with a suitable running fit with crescent shaped recesses in the said cylindrical bushing adjacent the said spindle, conduit means connecting the ends facing the direction of rotation of the said recesses to an external source of hydraulic fluid, and hydraulic means in communication with the ends lying in the said direction of rotation of the said recesses biasing the said shiftable bearing bushing in the same direction as the said comparatively weak resilient means with a force exceeding in order of magnitude their force as soon as the said spindle has exceeded its starting speed.

3. A journal and thrust bearing arrangement comprising in combination: a bearing casing, a first bearing bushing having a truncated conical bore fixedly mounted in the said casing, a second bearing bushing having a truncated conical bore tapering in the opposite direction to and in alignment with the said first bearing bushing, the said second bearing bushing being restrained from rotating but axially slidable relative to the said casing, a spindle having two opposed truncated conical bearing surfaces journalled respectively in the said fixed and axially slidable bearing bushings, comparatively weak resilient means abutting on the said casing and on the said slidable bushing biasing the latter towards its associated bearing surface on the said spindle, conduit means connected to the space between the said fixed truncated conical bearing bushing and its associated bearing surface on the said spindle, and hydraulic loading means connected to the said conduit means biasing the said shiftable bearing bushing in the same direction as the said comparatively weak resilient means with a force exceeding in order of magnitude their force as soon as the said spindle has exceeded its starting speed.

4. A journal and thrust bearing arrangement comprising in combination: a bearing casing, a first bearing bushing having a truncated conical bore fixedly mounted in the said casing, a second bearing bushing having a truncated conical bore tapering in the opposite direction to and in alignment with the said first bearing bushing, the said second bearing bushing being restrained from rotating but axially slidable relative to the said casing, a spindle having two opposed truncated conical bearing surfaces journalled respectively in the said fixed and axially slidable bearing bushings, comparatively weak resilient means abutting on the said casing and on the said slidable bushing biasing the latter towards its associated bearing surface on the said spindle, hydraulic pressure generating means operated by the said spindle and generating a pressure increasing at increasing speed of rotation thereof, hydraulic loading means exposed to the said hydraulic pressure biasing the said shiftable bearing bushing in the same direction as the said comparatively weak resilient means with a force exceeding in order of magnitude their force as soon as the said spindle has exceeded its starting speed, and hydraulic control means adjustably reducing the hydraulic pressure generated by the said generating means on its path to the said hydraulic loading means.

5. A journal and thrust bearing arrangement comprising in combination: a bearing casing, a first bearing bushing having a truncated conical bore fixedly mounted in the said casing, a second bearing bushing having a truncated conical bore tapering in the opposite direction to and in alignment with the said first bearing bushing, the said second bearing bushing being restrained from rotating but axially slidable relative to the said casing, a spindle having two opposed truncated conical bearing surfaces journalled respectively in the said fixed and axially slidable bearing bushings, comparatively weak resilient means abutting on the said casing and on the said slidable bushing biasing the latter towards its associated bearing surface on the said spindle, hydraulic pressure generating means operated by the said spindle and generating a pressure increasing at increasing speed of rotation thereof, and piston means connected to the said axially movable bearing bushing exposed to the said hydraulic pressure biasing the said shiftable bearing bushing in the same direction as the said comparatively weak resilient means with a force exceeding in order of magnitude their force as soon as the said spindle has exceeded its starting speed.

6. A journal and thrust bearing arrangement comprising in combination: a bearing casing, a first bearing bushing having a truncated conical bore fixedly mounted in the said casing, a second bearing bushing having a truncated conical bore tapering in the opposite direction to and in alignment with the said first bearing bushing, the said second bearing bushing being restrained from rotating but axially slidable relative to the said casing, a spindle having two opposed truncated conical bearing surfaces journalled respectively in the said fixed and axially slidable bearing bushings, comparatively weak resilient means abutting on the said casing and on the said slidable bushing biasing the latter towards its associated bearing surface on the said spindle, hydraulic pressure generating means operated by the said spindle and generating a pressure increasing at increasing speed of rotation thereof, hydraulic loading means exposed to the said hydraulic pressure biasing the said shiftable bearing bushing in the same direction as the said comparatively weak resilient means with a force exceeding in order of magnitude their force as soon as the said spindle has exceeded its starting speed, and at least two circular rows of prestressed balls arranged between the circumference of said axially shiftable bearing bushing and a bore of the said casing, guiding the said shiftable bearing bushing in the axial direction substantially without radial play.

7. In a spindle and bearing assembly, means defining a bearing casing, means defining a first bearing bushing, a truncated conical bore in said bushing, means fixedly securing said bushing in said casing with the base end of said truncated conical bore facing the interior of said casing, means defining a second bearing bushing, a truncated conical bore in said second bushing, means non-rotatably connecting said second bushing with said casing with the base end of said truncated conical bore of said second bushing facing said base end of said truncated conical bore of said first bushing and having a common center axis therewith, said connecting means permitting a limited axial movement of said second bushing in said casing, a spindle, a truncated conical bearing surface at each end of said spindle, one of said truncated conical bearing surfaces being journalled in the truncated conical bore of said first bushing and the other of said truncated conical bearing surfaces of said spindle being journalled in said truncated conical bore of said second bushing, resilient means associated with said casing and said second bushing and urging said second bushing towards said first bushing, thereby maintaining said first and second bushings in engagement with said truncated conical bearing surfaces of said spindle, a source of hydraulic fluid, means providing communication between said source of hydraulic fluid and the bearing surface of said first bearing bushing, means associated with the bearing surface of said first bearing bushing for generating a pressure in said hydraulic fluid of increasing magnitude with increasing speed of rotation of said spindle, means providing a pressure surface on said second bearing bushing, and means providing communication between said pressure generating means in said first bearing bushing and said pressure surface on said second bearing bushing so as to apply said generated pressure to said pressure surface and thereby urge said second bearing bushing with increasing force towards said first bearing bushing at increasing speed of rotation of said spindle.

References Cited in the file of this patent
UNITED STATES PATENTS

| 1,272,041 | Herr | July 9, 1918 |
| 2,584,770 | Wilcock | Feb. 5, 1952 |

FOREIGN PATENTS

| 568,724 | Great Britain | Apr. 18, 1945 |